(12) United States Patent
Powell et al.

(10) Patent No.: US 8,128,037 B2
(45) Date of Patent: Mar. 6, 2012

(54) APPARATUS AND METHOD FOR PASSIVE PURGING OF MICRO-PERFORATED AERODYNAMIC SURFACES

(75) Inventors: Arthur G. Powell, Huntington Beach, CA (US); Paul M. Vijgen, Everett, WA (US)

(73) Assignee: The Boeing Company, Chicago, IL (US)

( * ) Notice: Subject to any disclaimer, the term of this patent is extended or adjusted under 35 U.S.C. 154(b) by 560 days.

(21) Appl. No.: 12/356,018

(22) Filed: Jan. 19, 2009

(65) Prior Publication Data
US 2010/0181434 A1    Jul. 22, 2010

(51) Int. Cl.
*B64C 21/06* (2006.01)
(52) U.S. Cl. ......... 244/208; 244/204; 244/130; 244/207
(58) Field of Classification Search .................. 244/200, 244/204, 207, 208, 209, 130
See application file for complete search history.

(56) References Cited

U.S. PATENT DOCUMENTS

| | | | | |
|---|---|---|---|---|
| 1,810,693 A | * | 6/1931 | Alfaro | 244/211 |
| 1,829,616 A | | 10/1931 | Stalker | |
| 1,957,413 A | * | 5/1934 | Price | 244/208 |
| 2,646,945 A | | 7/1953 | Perry | |
| 2,721,715 A | * | 10/1955 | Hoadley | 244/130 |
| 2,873,931 A | * | 2/1959 | Fleischmann | 244/200 |
| 3,261,576 A | * | 7/1966 | Valyi | 244/130 |
| 3,317,162 A | * | 5/1967 | Grant | 244/209 |
| 3,332,644 A | * | 7/1967 | Whittley | 244/207 |
| 3,421,577 A | * | 1/1969 | Valyi | 165/170 |
| 4,102,499 A | | 7/1978 | Hall | |
| 4,418,879 A | | 12/1983 | Venderleest | |
| 4,477,040 A | * | 10/1984 | Karanik | 244/58 |
| 4,575,030 A | | 3/1986 | Gratzer | |
| 4,749,150 A | * | 6/1988 | Rose et al. | 244/53 B |
| 4,836,473 A | * | 6/1989 | Aulehla et al. | 244/130 |
| 5,354,015 A | * | 10/1994 | Meador | 244/134 F |

(Continued)

FOREIGN PATENT DOCUMENTS

EP        0532093        3/1993

(Continued)

OTHER PUBLICATIONS

International Search Report, PCT/US2010/021331, dated Dec. 9, 2010.

*Primary Examiner* — Benjamin P Lee
(74) *Attorney, Agent, or Firm* — Novatech IP Law; Charles S. Gumpel

(57) ABSTRACT

A purging system for a laminar flow control system comprises an air scoop and a diffuser fluidly connected thereto. The air scoop is disposable into an external flow of an external atmosphere. The diffuser is configured to fluidly connect the air scoop to a suction cavity of the laminar flow control system wherein the suction cavity may be disposed adjacent a porous skin of an airfoil such as adjacent a leading edge of the airfoil. The laminar flow control system may be configured to suction boundary layer flow passing over the porous skin by drawing a portion of the boundary layer flow through a plurality of pores formed in the porous skin. The diffuser ducts high pressure flow captured by the air scoop to the suction cavity for discharge through the pores to reduce the potential of blockage thereof.

23 Claims, 9 Drawing Sheets

U.S. PATENT DOCUMENTS

| | | |
|---|---|---|
| 5,779,196 A | 7/1998 | Timar |
| 5,813,625 A * | 9/1998 | Hassan et al. ............... 244/17.11 |
| 5,899,416 A | 5/1999 | Meister |
| 6,068,328 A * | 5/2000 | Gazdzinski ................. 296/181.5 |
| 6,349,899 B1 | 2/2002 | Ralston |
| 6,565,035 B1 * | 5/2003 | Kim et al. ...................... 244/1 R |
| 6,634,597 B2 | 10/2003 | Johnson et al. |
| 7,832,689 B2 * | 11/2010 | Prince et al. ............... 244/200.1 |
| 2002/0166923 A1 | 11/2002 | Munoz |
| 2006/0102776 A1 | 5/2006 | Hein |
| 2007/0221788 A1 | 9/2007 | Meister |
| 2008/0099631 A1 | 5/2008 | Parikh |
| 2010/0181435 A1 * | 7/2010 | Sakurai et al. ................ 244/209 |

FOREIGN PATENT DOCUMENTS

WO      WO03066430      8/2003

* cited by examiner

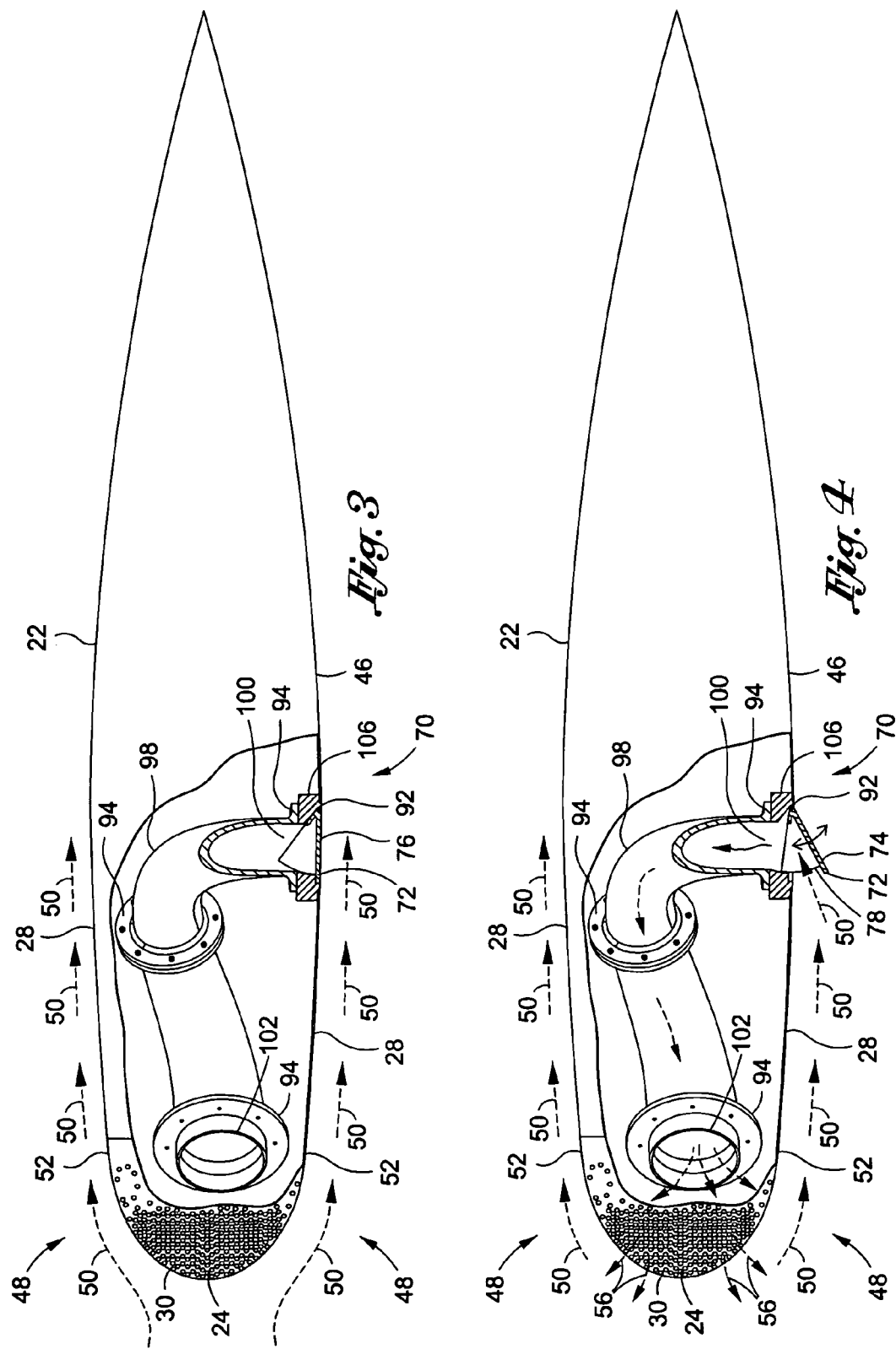

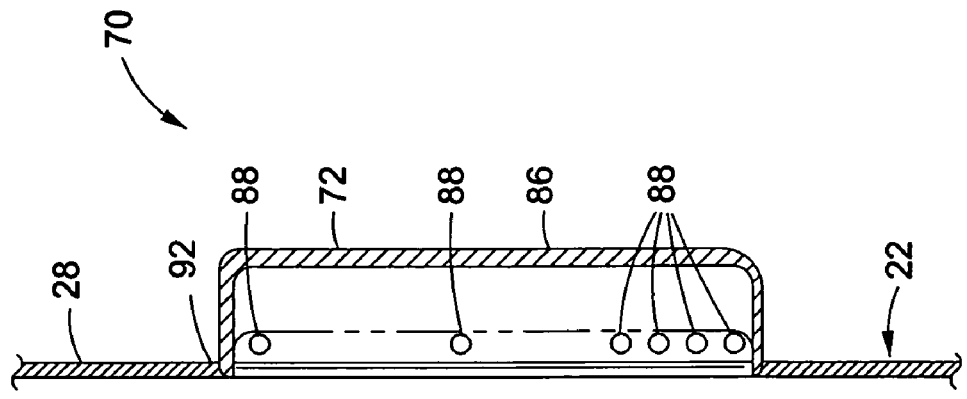
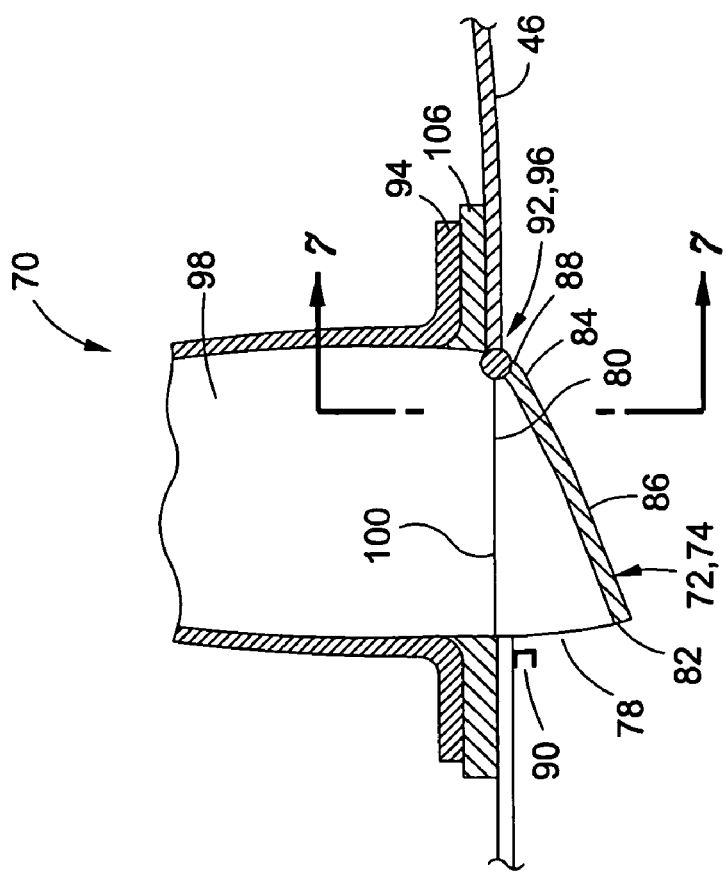

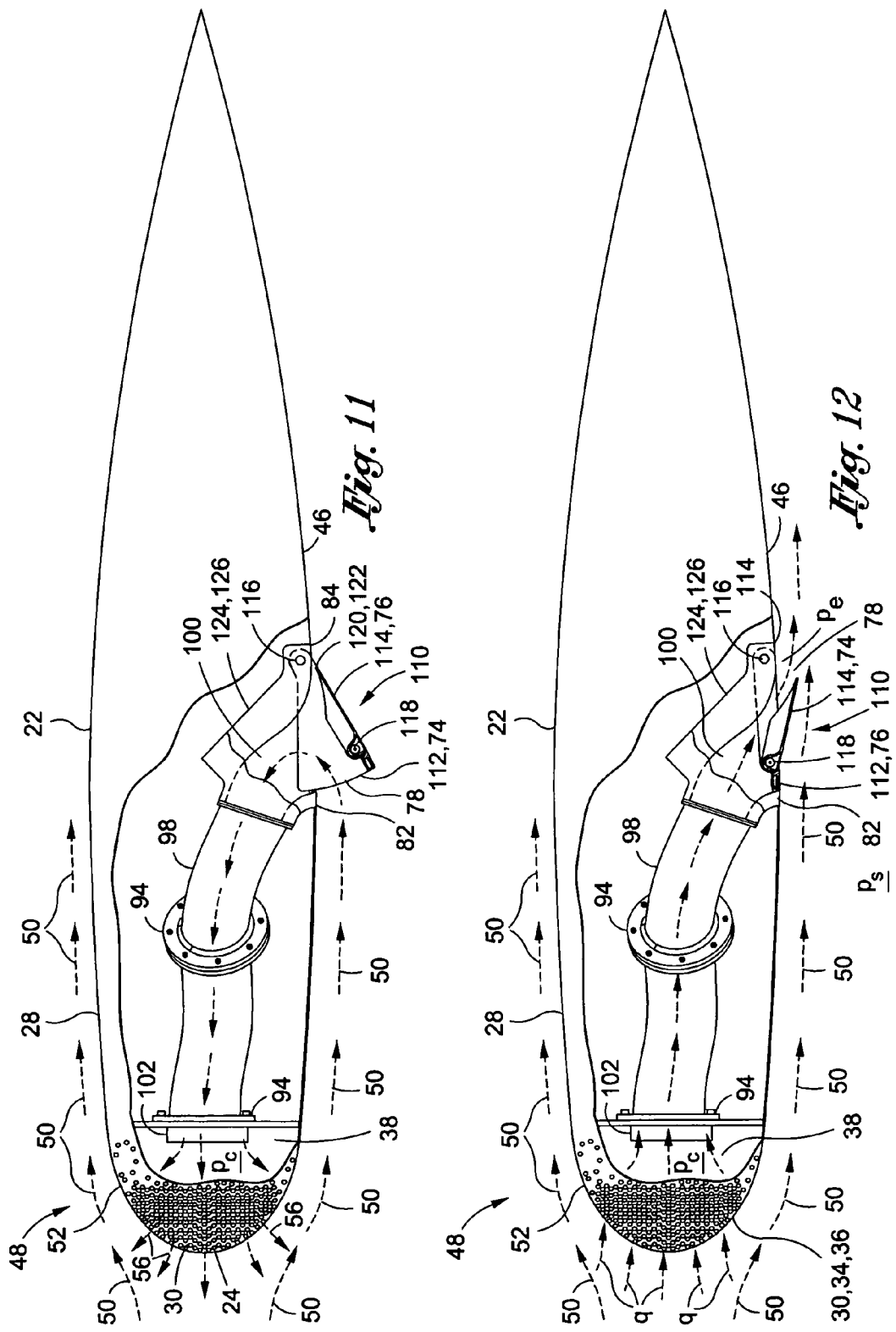

APPARATUS AND METHOD FOR PASSIVE PURGING OF MICRO-PERFORATED AERODYNAMIC SURFACES

CROSS-REFERENCE TO RELATED APPLICATIONS

This application is related to co-filed application Ser. No. 12/356,029 entitled DOOR ASSEMBLY FOR LAMINAR FLOW CONTROL SYSTEM filed on Jan. 19, 2009. This application is also related to application Ser. No. 11/763,569 entitled PASSIVE REMOVAL OF SUCTION AIR FOR LAMINAR FLOW CONTROL AND ASSOCIATED SYSTEMS AND METHODS filed on Jun. 15, 2007. The entire contents of the above-mentioned applications are expressly incorporated herein by reference.

STATEMENT RE: FEDERALLY SPONSORED RESEARCH/DEVELOPMENT (Not Applicable)

FIELD

The present disclosure relates generally to laminar flow control systems for aerodynamic surfaces and, more particularly, to a system and method of purging a porous skin of an airfoil by discharging pressurized air through pores formed in the porous skin.

BACKGROUND

It is generally known that maintaining laminar flow of air passing over an airfoil can improve the aerodynamics and performance of an aircraft. For example, it is known that delaying the transition of boundary layer airflow from laminar flow to turbulent flow over aerodynamic surfaces can reduce skin friction and reduce aerodynamic drag. One method of delaying the transition of airflow from laminar to turbulent flow is by installing a porous skin at critical areas of an airfoil such as along the leading edges of wings, tail surfaces and engine nacelles. The porous skin typically includes a large quantity of apertures or pores of relatively small size. The porous skin may also include narrow slots or elongated pores to provide porosity. The pores in the porous skin of a wing leading edge may be formed at diameters on the order of several thousandths of an inch (e.g., 0.0025") or less and at spacings of tens of thousandths of an inch (e.g., 0.035") between adjacent pores.

By applying a suctioning force to the porous skin, boundary layer airflow that is attached to the airfoil (i.e., along the attachment line) is drawn through the pores to stabilize the boundary layer against small disturbances which may grow and ultimately lead to early transition turbulence. The application of the suction force thins and robustifies the boundary layer velocity profiles. The net result is a delay in boundary-layer transition, a decrease in skin friction drag, and an increase in aerodynamic efficiency of the aircraft. The increase in aerodynamic efficiency may be especially noticeable at cruise altitudes for long distance flights wherein significant fuel savings may be achievable as a result of reduced aerodynamic drag.

One of the challenges preventing widespread implementation of laminar flow control systems of the suctioning type is contamination or blockage of pores which can occur under certain conditions. Such contamination may include atmospheric contamination and/or manmade contamination which can reduce the effectiveness of laminar flow control systems. For example, during takeoff and climb-out of an aircraft fitted with porous skins, precipitation in the form of rain or moisture in low-altitude clouds can fill the pores with water that will later freeze as the aircraft climbs into colder air. The frozen moisture blocks the pores and reduces the effectiveness of the suctioning system in maintaining laminar flow over the aircraft during cruise. Manmade contamination such as de-icing fluids applied during ground operations may also reduce the effectiveness of the laminar flow control system by clogging the pores with de-icing fluid.

The accumulation of frost on an aircraft may also reduce the effectiveness of a suctioning system by blocking the pores. Although frost accumulations on exterior skin surfaces of the porous skin may eventually sublimate away, moisture or liquid on the interior skin surfaces of the porous skin may become trapped in the pores and will remain as a result of the relatively small amount of surface area over which the sublimation occurs. Furthermore, local flow velocities inside the pores are relatively low and therefore insufficient to overcome surface tension resistance of the moisture trapped within the pores.

Prior art attempts at preventing clogging of pores include active purging systems wherein pressurized air is expelled or discharged outwardly through the pores. Purging systems may be activated prior to takeoff in anticipation of rain or moisture-laden clouds that may be encountered during climb-out. In this manner, such purging systems maintain the pores in an unblocked state and prevent the freezing of residual liquid that may be trapped within the pores. Although effective for their intended purposes, prior art purging systems suffer from several defects that detract from their overall utility.

For example, all known purging systems for use with laminar flow control systems of the suction type are active purging systems. Active purging systems require additional energy input in the form of engine bleed air or pumping machinery to provide the pressurized air for discharge through the pores of the laminar flow control system. The pressurized air may be drawn from engine compressors or other turbo-machinery. For example, pressurized air for the purging system may be provided by tapping a portion of the bypass flow of a high-bypass turbofan engine.

As may be appreciated, the system architecture of an active purging system such as one which draws pressurized air from an aircraft engine may be functionally and structurally complex. Such active purging systems require the installation of components and machinery which may increase complexity and add to fabrication and operational costs. Even further, the components of an active purging system may result in an increase in weight of the aircraft which may detract from gains in fuel efficiency otherwise attainable with the laminar flow control system.

Even further, some aircraft such as commercial airliners are increasingly fabricated without significant bleed air extraction from the engine. Although bleed air extraction has been conventionally used for various aircraft systems such as for cabin pressurization and in-flight de-icing, many modern aircraft are now substituting electrical power for conventional engine-generating pneumatic power (i.e., bleed air) in order to limit the amount of pneumatic power that is extracted from the engines such that the engines may produce maximum thrust. As such, conventional engine bleed air may be unavailable for powering an active purging system on future aircraft.

As can be seen, there exists a need in the art for a purging system for use with a laminar flow control system which avoids the complexity and weight associated with active purging systems. Furthermore, there exists a need in the art for a purging system for a laminar flow control system which requires a minimal amount of maintenance and which is low in cost.

BRIEF SUMMARY

These and other needs associated with purging systems for laminar flow control systems are specifically addressed and alleviated by the embodiments disclosed herein comprising a passive purging system for clearing pores in a porous skin. Advantageously, the purging system as disclosed herein provides for a system and method for reducing the potential for blockage of pores formed in a porous skin by preventing the retention of contaminants such as moisture, condensation, rain, snow, de-icing fluid, insect residue, dust and other debris within the pores.

Furthermore, by eliminating the need for auxiliary systems for providing pressurized air such as engine bleed air or pumping machinery common with active purging systems, the embodiments of the present disclosure avoid the complexity and weight disadvantages associated with such active purging systems. In this regard, the passive purging system as described herein provides technical benefits in regard to reduced cost, weight and complexity. Furthermore, the laminar flow control system remains functional at cruise altitudes where fuel-burning benefits are realized as a result of reduced skin friction.

In one embodiment, the purging system comprises an air scoop which may be forward-facing and disposable into a high pressure external flow of the external atmosphere. The purging system may further comprise a diffuser which fluidly connects the air scoop to a suction cavity located adjacent to the porous skin as part of a laminar flow control system. Air ducted through the diffuser is delivered to the suction cavity after which the air may be discharged through the pores in order to reduce the potential for blockage by various contaminants.

The air scoop may be mounted on an airfoil and may be deployable into an open position wherein the air scoop may be extended beyond the immediate boundary layer of the airfoil in order to reach the high pressure external flow. The air scoop may be configured to extract contaminants such as atmospheric moisture (i.e., rain, sleet, cloud droplets) out of the captured external flow such that dry air may be delivered to the suction cavity. The flow may be delivered to the suction cavity by the diffuser such that the flow may be discharged out of the pores formed in the porous skin and thereby freeing the pores from pre-existing liquid such as rain, water, de-icing fluids or other contaminants which may otherwise hinder operation of the laminar flow control system.

In one embodiment, the air scoop is configured to be movable between open and closed positions. In the open position, the air scoop may be deployed prior to takeoff, during climbout or during other flight operations wherein the aircraft may pass through atmospheric moisture or contaminants. The air scoop may be configured to be deployed into the open position prior to takeoff and then retracted when the aircraft reaches cruise altitude which is typically at below-freezing temperatures. Once at cruise altitude, the air scoop may be maintained in a closed position flush with an outer mold line of the airfoil throughout the remainder of the flight.

The air scoop preferably includes features that enable the purging system to extract water that may be captured by the air scoop. For example, the air scoop may include a curved outer cowl and may include drain holes or other drain apertures located at the aft end of the outer cowl in order to allow liquids captured by the air scoop to escape from the air scoop. In this manner, the air scoop prevents the entrainment of moisture and other contaminants in the air flow that is delivered to the suction cavity via the diffuser.

In another embodiment, the air scoop may be configured to deployable such that the opening of the air scoop faces the oncoming external flow for providing pressurized air to the suction cavity. The air scoop may also be configured to be depoyable such that the opening of the air scoop faces in a direction that is opposite the oncoming flow such that a suction force may be generated for suctioning the porous skin in order to thin and robustify the boundary layer.

In a further embodiment, the air scoop may be configured as a door assembly comprising a first door integrated with a second door. The second door may be pivotably mounted to the first door and may form a portion of the first door such that the second door moves with the first door when the first door is moved between the open and closed positions. Each one of the first and second doors may be pivotable between open and closed positions and may define an opening when moved to the open position. The first and second door openings may face away from one another.

The first door opening may be forward-facing (i.e., toward a direction of the oncoming external flow) and the second door opening may be aft-facing. The first door opening may be configured to capture the external flow which may be ducted to the suction cavity for discharge through the pores to remove contaminants in the pores. The second door opening may generate an external region aft of the second door that has an external pressure that is less than a cavity pressure within the suction cavity. The external pressure may generate a suction force within the suction cavity which may draw the external flow located proximate the porous skin through the pores and into the suction cavity.

The diffuser may be provided in a flow-efficient contour with at least one turn along its length such that contaminants entrained within the external flow captured by the air scoop may be deposited against inside surfaces of the diffuser whereafter the collected liquid may exit through a drain mechanism which may be optionally included on a lowermost point of the diffuser.

In an embodiment, the purging system may be installed on an airfoil having a swept leading edge such as a swept wing or a tail surface defining a leading-edge sweep angle. By mounting the air scoop and purging system on a swept airfoil, the cavity pressure is sufficient to overcome any surface tension resistance in liquid which may be otherwise trapped along the interior skin surface of the porous skin in the pores. Sizing (i.e., diameter) and configuration of the pores may be optimized to facilitate a reduction in the amount of pressure differential required between the suction cavity and the exterior skin surface of the porous skin due to local static pressure applied against the exterior skin surface. For example, by providing the pores in a relatively large diameter, the amount of pressure required in the suction cavity to overcome surface tension resistance is generally reduced. However, the size and configuration of the pores may be considered among other design parameters for achieving optimal suctioning of the boundary layer for laminar flow control purposes.

The present disclosure further provides a method of purging a laminar flow control system having a porous skin with a suction cavity fluidly connected to the external atmosphere through the plurality of pores formed in the porous skin. The method may comprise the steps of deploying the air scoop into the high pressure external flow of the external atmosphere followed by ducting of the external flow through the diffuser and into the suction cavity. The method may include purging the pores formed in the porous skin by discharging the ducted flow through the pores to the external atmosphere in order to clear the pores of debris or to prevent entry of contaminants such as liquid, insects, dirt, dust and other contaminants.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present disclosure will become more apparent upon reference to the drawings wherein like numbers refer to like parts throughout and wherein:

FIG. 3 is a sectional illustration taken along lines 3-3 of FIG. 2 of the purging system in an embodiment wherein the air scoop is shown in a closed position;

FIG. 4 is a sectional illustration taken along lines 4-4 of FIG. 2 and illustrating the air scoop in an open position;

FIG. 6 is a sectional illustration of the air scoop shown pivotally deployed into the open position to divert high pressure external flow into the diffuser for delivery to the suction cavity and further illustrating a diverter channel for limiting entry of surface water runback;

FIG. 7 is a sectional illustration of the air scoop taken along lines 7-7 of FIG. 6 and illustrating one or more drain holes preferably formed in an aft end of the air scoop for draining liquid contained within the external flow captured by the air scoop;

FIG. 11 is a sectional illustration of the door assembly wherein the first door is in the open position and the second door is in the closed position;

FIG. 12 is a sectional illustration of the door assembly wherein the second door is in the open position and the first door is in the closed position.

DETAILED DESCRIPTION

Figure 1:
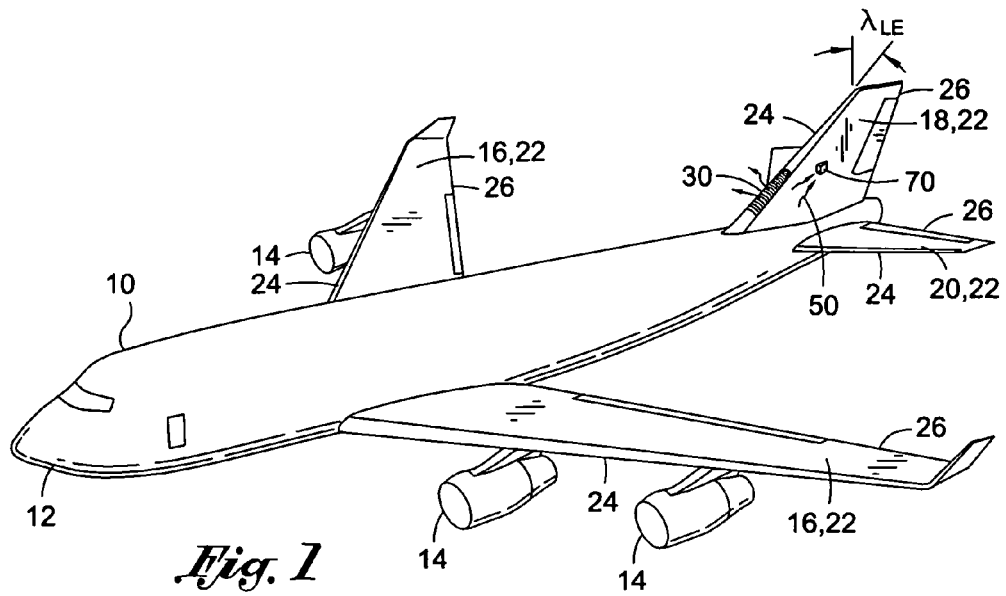
FIG. 1 is a perspective illustration of an aircraft having a purging system installed thereon.

Referring now to the drawings wherein the showings are for purposes of illustrating preferred and various embodiments of the disclosure only and not for purposes of limiting the same, shown in the figures is a purging system 70 and method for passively purging of pores 36 formed in a porous skin 30 which may be a part of a laminar flow control system. The passive purging system 70 comprises an air scoop 72 which is disposable into a high pressure external flow 50 of an external atmosphere 48. The external flow 50 may be ducted to a suction cavity 38 which also may form a part of the laminar flow control system. The ducted flow is discharged through the pores 36 in order to reduce the potential for blockage of the pores 36 such as from moisture, condensation, rain, snow, de-icing fluids, debris, insect residue and other contaminants.

Although illustrated as being installed on an aircraft 10 in FIG. 1, it should be noted that the purging system 70 as disclosed herein may be implemented on any type of vehicle including, without limitation, any air vehicle, land vehicle or other type of vehicle over which laminar flow may be desired. In addition, the purging system 70 may be installed for purging a porous surface having functionality other than for achieving laminar flow. Furthermore, although FIG. 1 illustrates the purging system 70 as being installed on a tail section such as the vertical tail 18 of the aircraft 10, the purging system 70 may be installed at any location on the aircraft 10 including, without limitation, the wings 16, horizontal tail 20, or any other aerodynamic surfaces including the fuselage 12, wing/body and various other aerodynamic members such as the nacelle of a jet engine 14.

In one embodiment, the purging system 70 may be installed on an air vehicle as a means for purging pores 36 in a laminar flow control system for critical areas of an airfoil 22 such as for a leading edge 24 or trailing edge 26 of a wing 16 or tail surface or on the leading edge of an engine 14 inlet. The purging system 70 may be installed on a vehicle wherein flow along a direction from an interior skin surface 32 of the porous skin 30 toward an exterior skin surface 34 is desired in order to purge the pores 36 of objects or liquid 54 trapped therewithin. The flow through the pores 36 may also prevent blockage or clogging of the pores 36 from various types of contaminants.

Figure 2:
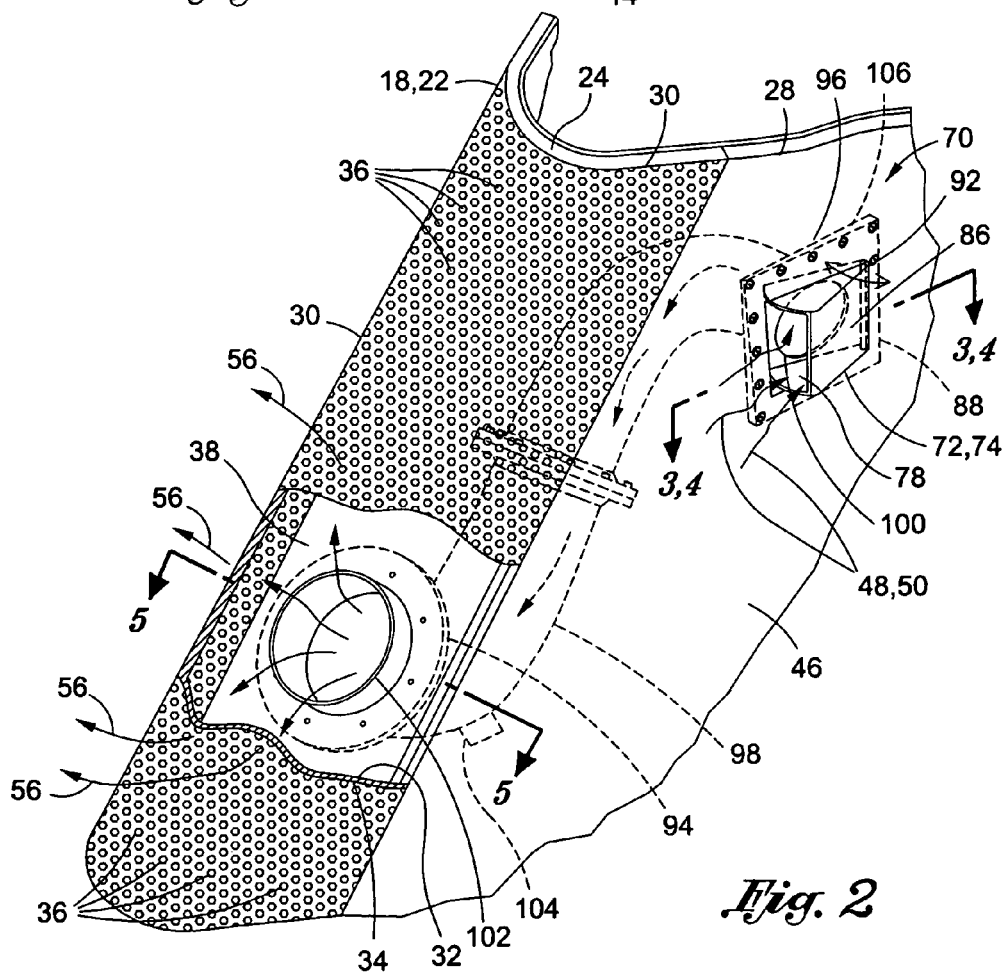
FIG. 2 is an enlarged perspective illustration of the purging system installed on a tail section of the aircraft and further illustrating an air scoop fluidly connected to a porous skin disposed on a leading edge of the tail section by means of a diffuser.

Referring to FIG. 2, shown is an enlarged view of the purging system 70 installed on a vertical tail 18 as shown in FIG. 1. In a broad sense, the purging system 70 comprises an air scoop 72 which may be forward-facing and a diffuser 98 configured to duct or direct flow captured by the air scoop 72 to an interior skin surface 32 of the porous skin 30. As can be seen in FIG. 2, in one embodiment, the air scoop 72 has forward and aft ends 82, 84 with an opening 78 being deployable into an open position 74 on the forward end 82 of the air scoop 72. The air scoop 72 may have a tapered configuration on the aft end 84 for directing moisture, precipitation or other contaminants that impinge upon the air scoop 72 interior to move toward the aft end 84 of the air scoop 72 wherein drain holes 88 formed in the aft end 84 of the air scoop 72 may allow for draining of such impinging contaminants to the external atmosphere 48. In this regard, the air scoop 72 may be configured to separate contaminants from the external flow captured by the air scoop 72 due to impingement of the contaminants on the air scoop 72 interior. The air scoop 72 drain holes 88 may be provided in a wide variety of configurations including, but not limited to, circular holes, slots, perforations and any other suitable configuration that facilitates the removal of contaminants from the air scoop 72.

The diffuser 98 may be configured to fluidly connect the air scoop 72 to the interior skin surface 32 of the porous skin 30. In one embodiment, the diffuser 98 may have a diffuser inlet 100 and a diffuser outlet 102 to fluidly connect the air scoop 72 to the suction cavity 38 which may be located at a leading edge 24 of an airfoil 22 such as the leading edge 24 of the vertical tail 18 illustrated in FIG. 2. The suction cavity 38 may be collectively defined by the porous skin 30 on the leading edge 24 of the airfoil 22 and a forward spar or other member to provide a sealed cavity to which suction may be applied via a suction system as part of the laminar flow control system.

Although illustrated in FIG. 2 as comprising a single porous skin 30 exposed to the external flow 50 of the external atmosphere 48, it is contemplated that the porous skin 30 may comprise an outer layer of skin having pores 36 and an inner layer of skin (not shown) that is devoid of pores 36 and which may be disposed in spaced relation to the outer layer. The double-skin (i.e., inner and outer layers) arrangement may enhance the stiffness of the leading edge 24 of the airfoil 22. Further in this regard, the inner layer may comprise a series of spaced hat sections which are attached to the interior skin surface 32 of the porous skin 30 to provide stiffness to the leading edge 24.

Regardless of whether the porous skin 30 is provided in a single layer or a multi-layer configuration, the diffuser outlet 102 may be fluidly connected with the interior skin surface 32 of the porous skin 30. The diffuser outlet 102 may feed into the suction cavity 38 which may be also referred to as a D-tube defined by the leading edge 24 of the wing 16 and the forward-most spar of the airfoil 22.

Although the pores 36 in the porous skin 30 are illustrated as comprising generally circularly shaped holes at approximately constant spacing, the pores 36 may be formed in a variety of geometries and configurations such as slots, non-circular perforations and other geometries or combinations thereof and at non-constant spacings between consecutive pores. Regardless of the specific configuration of the pores 36, the porous skin 30 fluidly connects the suction cavity 38 to the external atmosphere 48 for stabilizing the boundary layer 40 flow in a preferably laminar state along the attachment line 42. As was earlier mentioned, the discharge of air through the pores 36 in a direction opposite the direction for suction facilitates purging of the pores 36 to rid the pores 36 of contaminants.

In a preferable embodiment, the pores 36 may have a hole size of between 0.0015 inches and 0.0030 inches and may be spaced at spacings of approximately 0.020 inches to 0.050 inches although any spacing may be applied and the pores 36 may be of any size. A preferable configuration of the pores 36 is a circular cross-sectional shape with a diameter of approximately 0.0015 inches. Although holes of small diameter are preferable from a functional viewpoint for improving suction, such small hole sizes may present manufacturing issues and may require a relatively higher pressure to overcome surface tension resistance in liquid 54 trapped on an interior skin surface 32 of the porous skin 30 as compared to a lower pressure required to discharge or blow out surface tension liquid 54 trapped in pores 36 of larger diameter. In this regard, pore 36 sizes of approximately 0.0025 inches may be easier to manufacture and may require a lower pressure to overcome surface tension relative to pore sizes of approximately 0.0015 inches.

For purposes of overcoming surface tension resistance, the pores 36 preferably have a profile along an axial direction such that the cross-sectional area of the pore 36 on the interior skin surface 32 is larger than the cross-sectional area of the pore 36 on the exterior skin surface 34 of the porous skin 30. In this regard, the pores 36 may preferably have an inverted conical shape or, more preferably, a Gaussian-shaped profile (i.e., a bell shape) when viewed along an axial cross section. In either regard, the pores 36 are preferably formed such that they are larger at the interior skin surface 32 than at the exterior skin surface 34 of the porous skin 30.

The spacing of the pores 36 may be varied or uniform or a combination thereof. For example, the spacing between the pores 36 may be relatively uniform along the forward-most point of the leading edge 24. In addition, the pores 36 may have a spacing that gradually increases along a length extending aftwardly from the forward-most point of the leading edge 24. Likewise, the pores 36 may have a spacing that varies along a longitudinal length of the leading edge 24 or the spacing may be uniform along the length of the leading edge 24.

Referring to FIGS. 2-4, shown is the purging system 70 in an embodiment having the air scoop 72 disposed on a side of the airfoil 22. An example is shown mounted on a vertical tail 18 of the aircraft 10. However, it should be noted that this embodiment of the purging system 70 may also be applied on other locations of a vehicle including, but not limited to, the leading edge 24 of a wing 16 and the leading edge of an engine 14 inlet. The air scoop 72 may be installed at a location that minimizes interference or disruption of the boundary layer flowing along an airfoil 22. For example, the air scoop 72 may be mounted on a tip of a vertical tail 18 or horizontal tail 20 of an aircraft 10 or toward an aft end of a fuselage 12 of the aircraft 10. In an embodiment shown, the air scoop 72 may be configured to be mounted on the airfoil 22 to which the purging system 70 provides discharging flow 56 to the porous skin 30. However, as indicated above, the air scoop 72 may be mounted in a location that is not disruptive to laminar flow over the airfoil 22. In this regard, it is contemplated that the air scoop 72 may be mounted on sections of the aircraft 10 that are not common to the location of the porous skin 30. For example, the air scoop 72 may be mounted on the fuselage 12 of the aircraft 10 with the diffuser 98 ducting the high pressure external flow 50 from the air scoop 72 to the suction cavity 38 on the tail section and/or on the wing 16 or other aerodynamic surface of the aircraft 10.

In a preferable embodiment, the air scoop 72 is configured to be mounted substantially flush with an outer mold line 28 surface of the airfoil 22 when the air scoop 72 is in a closed position 76 as shown in FIG. 3. The air scoop 72 may be configured to be deployed into the open position 74 such as by pivoting about a pivot axis 92 disposed toward an aft end 84 of the air scoop 72 as shown in FIG. 4. Ideally, the air scoop 72 is configured to allow for simple deployment and stowing. Stowing of the air scoop 72 in the flush configuration illustrated in FIG. 3 facilitates a reduction in cruise drag. In a preferred embodiment, the air scoop 72 may be oriented relative to the local streamline direction of the external flow 50 in order to maximize intake pressure at the opening 78 of the air scoop 72.

Deployment of the air scoop 72 may be provided by a number of different modalities including, but not limited to, pilot activation such as prior to takeoff. In this regard, the air scoop 72 may be deployed into the open position 74 when the flaps are set for takeoff prior to departure. Additionally, or in combination with pilot activation, the air scoop 72 may be deployed into the open position 74 autonomously such as upon sensing of certain environmental conditions or other atmospheric parameters. For example, during precipitation events such as rain or snow, sensors may detect moisture on the exterior skin surface 34 of the porous skin 30 and may transmit signals representative of the moisture to an actuation mechanism 96 which may autonomously deploy the air scoop 72 into the open position. Likewise, sensors may be employed along the interior skin surfaces of the porous skin 30 to detect the presence of moisture which may be retained by surface tension as a result of a drying of the exterior skin surface 34 after a precipitation event but wherein moisture is retained on the interior skin surface 32.

Furthermore, the air scoop 72 may be deployed by an actuation mechanism 96 configured to detect the presence of other debris including insect residue, dust, and other forms of contamination which present the potential for clogging or blockage of the pores 36. In insect-laden environments, the air scoop 72 may be deployed into the open position 74 upon the detection of a predetermined level of insect residue buildup on the exterior skin surface 34 of the porous skin 30. The air scoop 72 may also be configured to be deployed by the pilot in areas known to have high concentrations of insects.

Regardless of the type of event or condition upon which the air scoop 72 is deployed into the open position, the air scoop 72 preferably has a geometry and configuration which facilitates the deployment of the air scoop 72 to the external atmosphere 48. The air scoop 72 opening 78 may be extended laterally outwardly to a position beyond the thickness of the boundary layer 40 in order to permit high pressure external flow 50 to be captured for ducting into the suction cavity 38. In one embodiment, it is contemplated that the air scoop 72 is configured to be deployable into the open position 74 wherein the outward most surface of an outer cowl 86 of the air scoop 72 is spaced at least approximately 6 inches from the outer mold line 28 of the airfoil 22. However, the extent of deployment of the air scoop 72 into the external flow 50 is dependent upon the localized boundary layer 40 conditions at different flight parameters. Ideally, the air scoop 72 may be deployed to an extent that limits entry of relatively low-momentum boundary layer 40 such that the air scoop 72 may capture a maximized amount of high pressure flow for delivery to the suction cavity 38. In this regard, the air scoop 72 may be deployed at positions intermediate the open and closed positions 74, 76

Referring to FIG. 6, shown is a cross section of the air scoop 72 illustrating the pivot axis 92 located at the aft end 84 of the air scoop 72. As can be seen, the air scoop 72 comprises the opening 78 disposed at a forward end 82 and a scoop outlet 80 which may be co-located with a diffuser inlet 100 at the aft end 84. In one embodiment, the air scoop 72 may comprise the outer cowl 86 having a pair of side walls extending inwardly therefrom. The outer cowl 86 may be curved at least on an inside surface thereof or the outer cowl 86 preferably has a configuration which facilitates the draining of water or other contaminants from the air scoop 72.

Referring briefly to FIG. 7, shown is the aft end 84 of the air scoop 72 having one or more drain holes 88 (e.g., circular holes, elongate slots, etc.) formed therein to facilitate draining of liquid 54 and/or other contaminants which may be contained within the external flow 50 and which may be captured by the air scoop 72 in the open position. The drain holes 88 may be biased toward the lower end of the air scoop 72 to facilitate discharge of liquid 54 and/or contaminants under the influence of gravity. However, drain holes 88 may also be formed at spaced intervals along the aft end 84 of the air scoop 72 to facilitate draining of liquid 54 along a length of the aft end 84. The liquid may be captured by the air scoop 72 as the aircraft 10 passes through a rain storm or clouds.

Referring to FIG. 6, optionally disposed on a forward end 82 of the air scoop 72 may be a diverting channel 90 which may be formed in a wedge-shape or C-shape or other suitable configuration for purposes of diverting surface water 52 runback and thereby preventing entry thereof into the air scoop 72 and/or diffuser 98. The surface water 52 runback may be flowing along the airfoil 22 in an aftwardly direction as the aircraft 10 flies through a precipitation event. The diverting channel 90 may be mounted in a variety of alternative locations other than that which is illustrated in FIG. 6. Ideally, the diverting channel 90 may be configured such that its protrusion from the outer mold line 28 of the airfoil 22 is minimal and, in this regard, may be between approximately 0.020 to approximately 0.200 inches to minimize aerodynamic drag.

In an alternative embodiment, the diverting channel 90 may comprise a groove formed in the outer mold line 28. The groove may extend at least partially around a perimeter of the air scoop 72 opening 78 along the outer mold line 28 and may be shaped to provide a channel along which surface water 52 runback may drain around the air scoop 72 to avoid entry into the diffuser 98. As may be appreciated, a variety of different sizes, shapes and configurations of the diverting channel 90 are contemplated for limiting entrance of surface water 52 runback into the air scoop 72. In yet another embodiment, the diverter channel 90 may be actuated such that it is substantially flush with an external surface 46 of the airfoil 22 or other portion of the aircraft 10 when the air scoop 72 is retracted or placed in the closed position 76.

Figure 5:
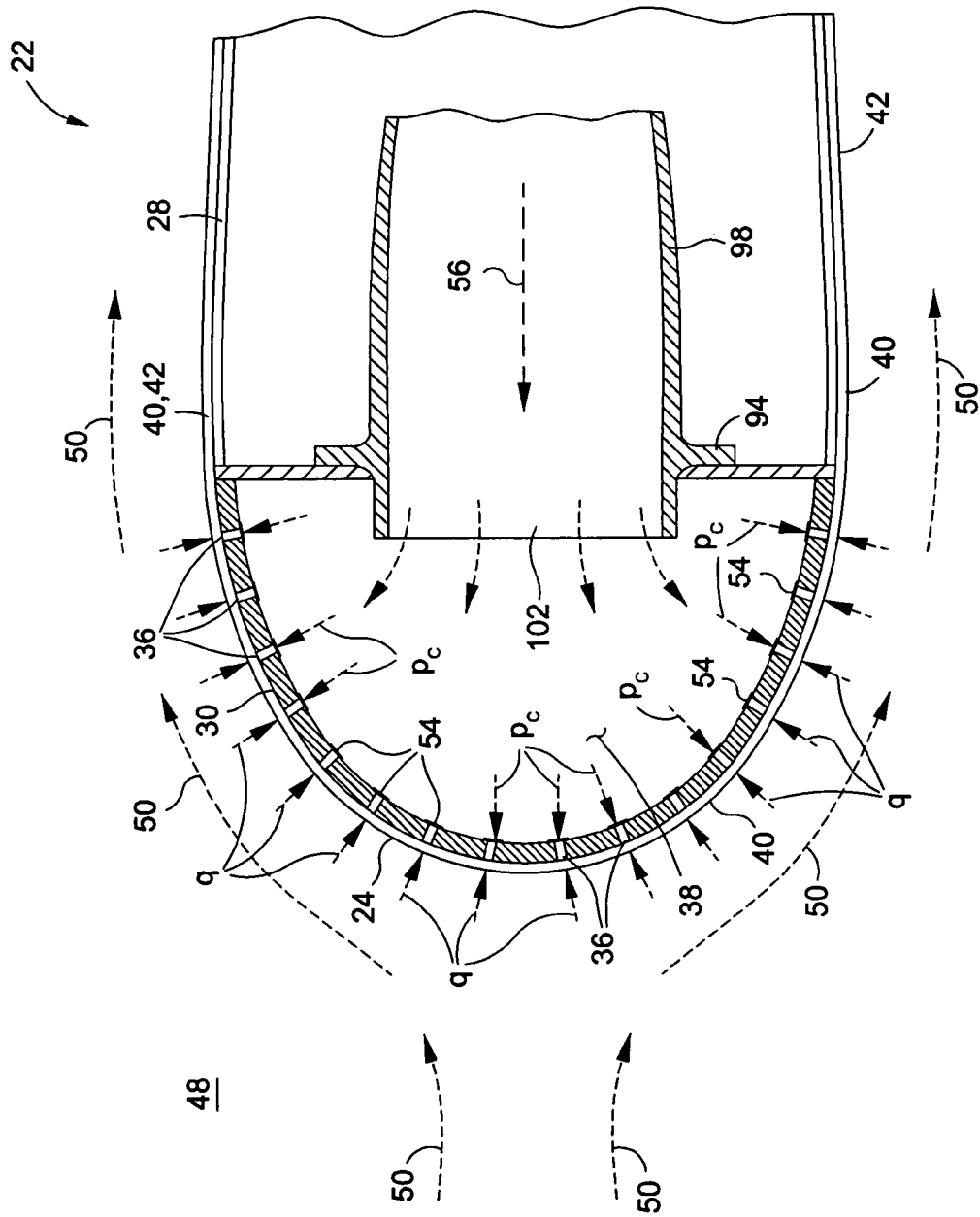
FIG. 5 is an enlarged sectional view taken along lines 5-5 of FIG. 2 and illustrating a leading edge of the tail section wherein flow into the suction cavity at the leading edge generates a cavity pressure ($p_c$) that may be sufficient to overcome surface tension resistance of liquid retained along the interior skin surface of the porous skin at the pores.

Referring to FIG. 5, shown is an enlarged sectional illustration of an airfoil 22 having the diffuser outlet 102 communicatively mounted relative to the suction cavity 38. Although the suction cavity 38 is shown as being disposed adjacent the leading edge 24 of the airfoil 22, the suction cavity 38 may be disposed at any location along the airfoil 22 and is not limited to the leading edge 24. As shown in FIG. 5, the diffuser 98 preferably has an expanding cross-sectional area for expanding the flow from the air scoop 72 to the suction cavity 38.

As best seen in FIGS. 3-4, the diffuser 98 has a relatively small size at the diffuser inlet 100 adjacent the air scoop 72 as compared to the size of the diffuser outlet 102 at the suction cavity 38. In this regard, the diffuser 98 preferably has an expanding cross-sectional area along a direction from the diffuser inlet 100 to the diffuser outlet 102. The expanding cross-sectional area may be sufficient to cause a reduction in the velocity of flow through the diffuser 98. In this regard, the diffuser 98 may be configured to diffuse the external flow 50 captured by the air scoop 72 due to its smooth inside surfaces and curved configuration. In this manner, the diffuser 98 may efficiently duct the flow with minimal energy losses due to skin friction resistance or abrupt changes in direction of the flow.

Figure 8:
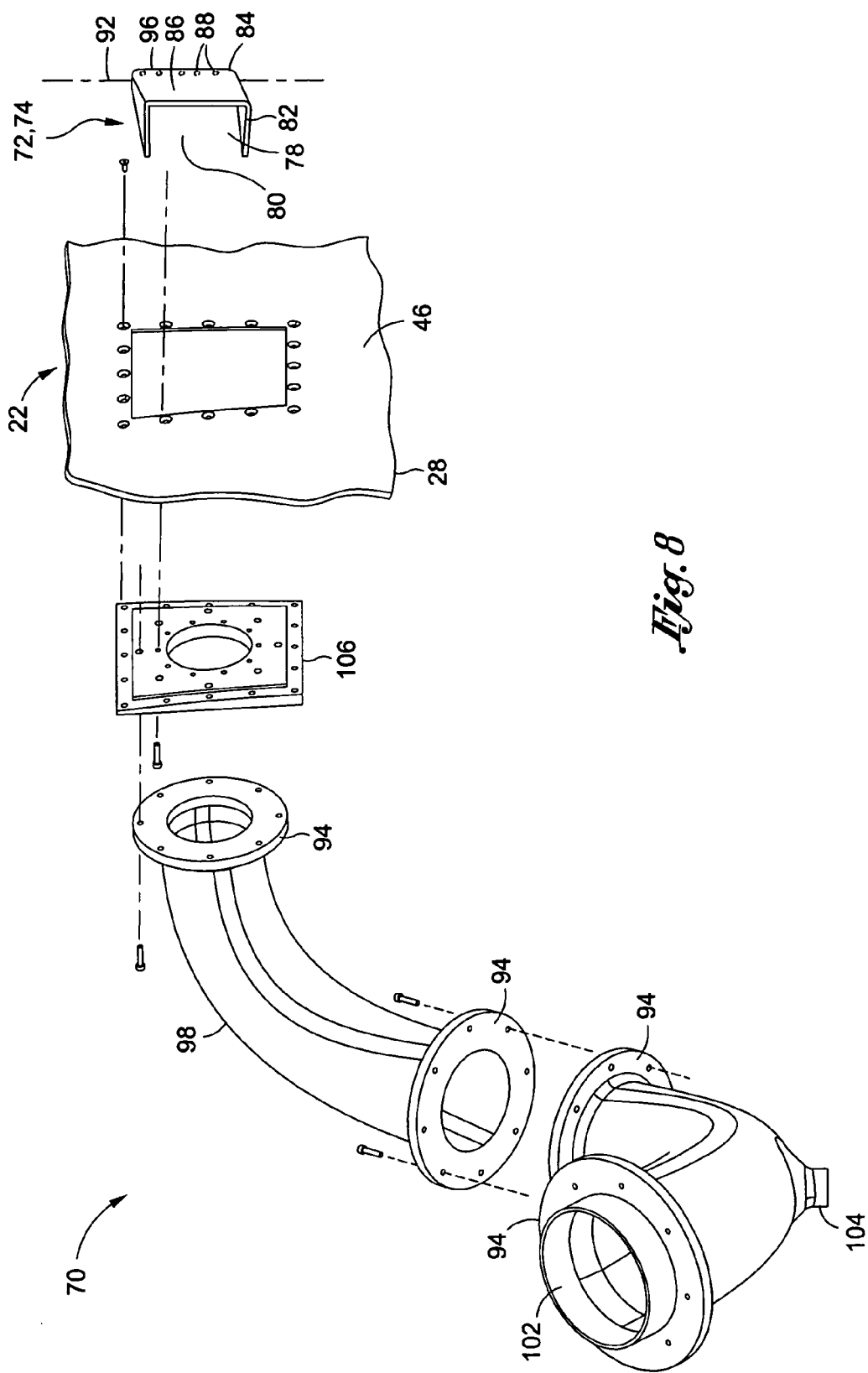
FIG. 8 is an exploded perspective view of the purging system illustrating the interconnectivity of the air scoop to the diffuser and further illustrating a drain mechanism installed in the diffuser for draining fluid collected in the diffuser.

Referring briefly to FIG. 6, the diffuser inlet 100 is shown mounted to an interior skin surface 32 of the airfoil 22 such as by means of a spacer 106 which may have a variable thickness compatible with differences in spacing between the flange 94 mounted on the diffuser inlet 100 and the inside surface of the airfoil 22. As shown in FIG. 8, the purging system 70 may be installed using the spacer 106 and a plurality of fasteners extending around an opening 78 formed in the airfoil 22 skin.

The opening 78 may be sized and configured to be compatible with the geometry of the air scoop 72. Although illustrated as having a rectangular configuration compatible with the generally rectangular or square shape of the air scoop 72, a variety of alternative sizes and configurations are contemplated for the spacer 106 as well as for the opening 78 or cutout formed in the airfoil 22 for the air scoop 72. The diffuser 98 may be mounted directly to the airfoil 22 or may be mounted to the spacer 106 which, in turn, may be mounted to the airfoil 22 by means of a plurality of fasteners, adhesive bonding or by methods or combinations thereof.

Referring to FIGS. 4 and 8, the diffuser 98 in one embodiment may include at least one turn along its length to facilitate extraction of contaminants such as moisture and other debris from the external flow 50 captured by the air scoop 72. In this regard, the diffuser 98 may be shaped to extract contaminants as a result of turns in the flow path. The diffuser 98 is configured such that the captured contaminants may run down along the inside surfaces of the diffuser 98 under the influence of gravity prior to exiting at the drain mechanism 104 as best seen in FIG. 8.

The diffuser 98 may contain at least one drain mechanism 104 which may be located at the lowest point at the diffuser 98 for draining fluid or other contaminants collected in the diffuser 98. Referring briefly to FIG. 2, the air scoop 72 is shown installed at an elevation that is higher than the elevation of the diffuser outlet 102. The drain mechanism 104 may be at a level which is lower than either the diffuser outlet 102 or the air scoop 72 such that any liquid 54 or contaminants captured by the air scoop 72 may collect at the drain mechanism 104 which may be at the lowest point in the diffuser 98. The purging system 70 may be configured such that the air scoop 72 is positioned at a level which is lower than the level of the diffuser outlet 102 to minimize the potential for containments such as liquids entering the suction cavity 38.

Referring briefly to FIG. 8, shown is the interconnectivity of the diffuser 98 with the air scoop 72 in relation to the airfoil 22. It can be seen that the diffuser 98 may be provided in one or more sections which may be joined such as via mechanical fasteners through mating flanges 94 formed on abutting edges of the diffuser 98. Opposing ends of the diffuser 98 may also include flanges 94 for mating to the air scoop 72 and for mating to the suction cavity 38. Although the diffuser 98 is illustrated as comprising a generally tubular shape, it is contemplated that a variety of alternative sizes, shapes and configurations of the diffuser 98 are possible. Advantageously, the passive purging system 70 has no moving parts which simplifies fabrication, assembly and installation.

Figure 9:
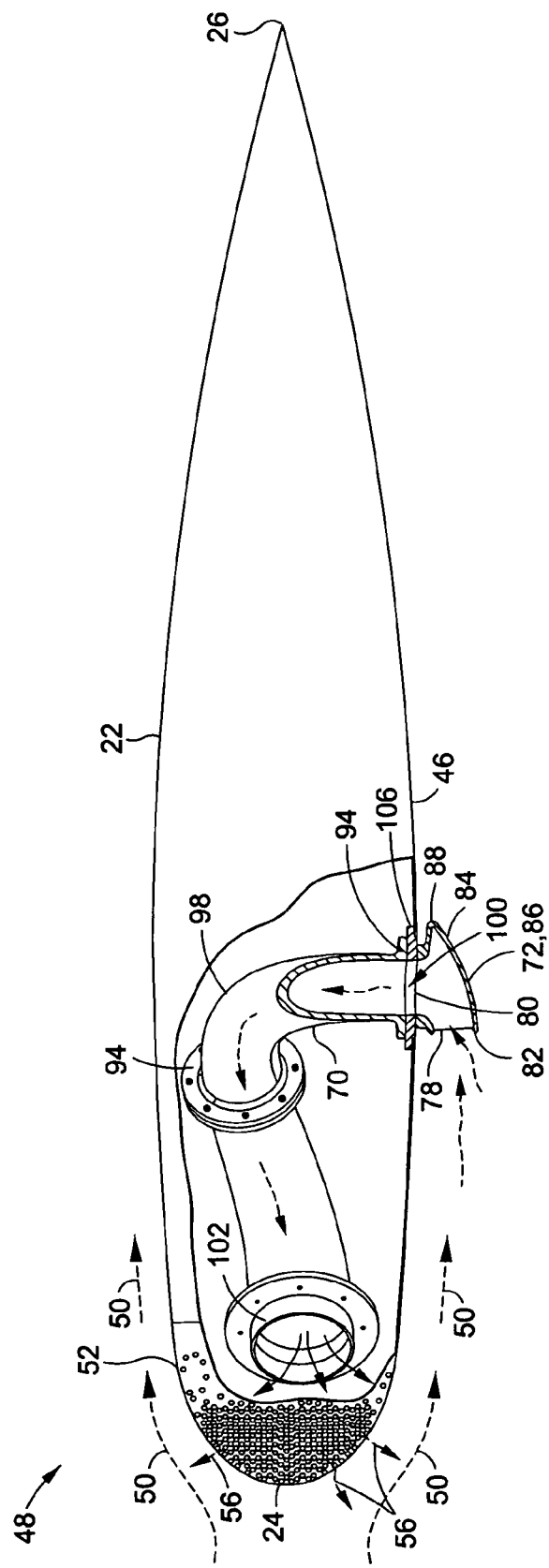
FIG. 9 is a sectional illustration of the purging system in an alternative embodiment illustrating a pitot-type air scoop disposed in laterally-spaced relationship to an outer mold line of the airfoil.

Referring briefly to FIG. 9, shown is an embodiment of the purging system 70 comprising a pitot-type installation of the air scoop 72 wherein the air scoop 72 is positioned in spaced lateral relation to the outer mold line 28 of the airfoil 22. In this regard, the air scoop 72 may be mounted such that the opening 78 is continuously exposed to the high pressure external flow 50. However, the air scoop 72 may be configured to be retracted and stowed flushed with the outer mold line 28 surface or substantially below the outer mold line 28 surface to avoid disruption of the aerodynamics of the airfoil 22.

An advantage of mounting the air scoop 72 in fixed relation to the outer mold line 28 of the airfoil 22 is the ability to prevent the ingestion of surface water 52 runback into the diffuser 98. In addition, by positioning the air scoop 72 in fixed relation to the outer mold line 28 of the airfoil 22, the air scoop 72 may achieve high pressure recovery of the external flow 50 and avoid ingestion of lower momentum boundary layer 40 air. However, as was indicated above, the air scoop 72 may be provided in a deployable arrangement similar to that which is illustrated in FIGS. 3 and 4 wherein the air scoop 72 pivots outwardly into the open position 74 during use and may be pivoted into a closed position 76 during periods of non-use.

Referring briefly to FIGS. 1 and 2, the purging system 70 as disclosed herein may be configured to be installed on a swept airfoil 22 such that the pressure generated in the suction cavity 38 as compared to the local static pressure q exerted on the exterior skin surface 34 is greater than the surface tension resistance of the liquid 54 which may be trapped within the pores 36 on the interior skin surface 32 of the porous skin 30. As was previously mentioned, the pores 36 may be of a size which causes the retention of liquid 54 along the interior skin surface 32 as a result of surface tension resistance within the liquid. In order to overcome the surface tension resistance of the liquid 54 so that the liquid 54 may be discharged back to the external atmosphere 48, it is necessary that the cavity pressure $p_C$ within the suction cavity 38 is greater than the local static pressure q exerted on the exterior skin surface 34 of the porous skin 30.

As is known in the art, local static pressure on a surface is, for a given flight altitude, related to the square of the local velocity of the external flow 50 proximate the surface. The cavity pressure $p_C$ within the suction cavity 38 is also related to the external flow 50 pressure at the opening 78 of the air scoop 72. Therefore, in order to overcome the surface tension resistance of liquid 54 retained within the pores 36 along the interior skin surface 32 of the porous skin 30, it is necessary that the pores 36 are sized and configured such that a pressure differential $\Delta_P$ between the cavity pressure $p_C$ and the local static pressure q exerted is sufficient to overcome the surface tension resistance. By so configuring the pore 36 size, the liquid 54 in the pores 36 may be readily discharged into the external atmosphere 48 under the cavity pressure. The pores 36 are preferably sized and configured to have a collective leakage area that is sufficient to cause a buildup in cavity pressure $p_C$ to overcome the surface tension resistance in the pores 36. In an embodiment, the pores 36 may be sized and configured to have a minimum width in order to generate sufficient cavity pressure $p_C$. Likewise, the collective cross-sectional areas of all the pores 36 may be factored in determining the amount of cavity pressure $p_C$ necessary to overcome the local static pressure q such that the liquid 54 retained within the pores 36 may be discharged.

The leading-edge sweep angle $\lambda_{LE}$ of the airfoil 22 to which the purging system 70 is installed also has a bearing on the optimal pore 36 size and pore 36 spacing. Ideally, the air scoop 72 is configured such that the total pressure collected thereby is equal to the local static pressure q. For example, at 200 knots, the local static pressure q is approximately 1 psi at relatively low flight altitudes. A preferred configuration of the air scoop 72 and purging system 70 is one that allows for delivery of approximately 1 psi to the suction cavity 38. The mass flow rate through the diffuser 98 necessary to overcome the surface tension resistance can be calculated by determining the collective cross-sectional areas of the pores 36 and by knowing 16 the cross-sectional area of the suction cavity 38 as well as the external pressure distribution exerted thereupon under local static pressure q.

The external pressure distribution is affected by the leading-edge sweep angle $\lambda_{LE}$ of the airfoil 22. In this regard, it should be noted that leading-edge sweep angle $\lambda_{LE}$ may be negative (i.e., forward sweep of the wing leading edge relative to flight direction). In general, an increase in leading-edge sweep angle $\lambda_{LE}$ results in a proportionate decrease in local static pressure q exerted along the exterior skin surface 34 as pressure generally varies with the square of the cosine of the leading-edge sweep angle $\lambda_{LE}$. For airfoils having comparatively less leading-edge sweep angle $\lambda_{LE}$, the pressure differential $\lambda_P$ between the suction cavity 38 and the external atmosphere 48 may be proportionately less such that the pores 36 may be formed in a relatively larger diameter.

Figure 10:
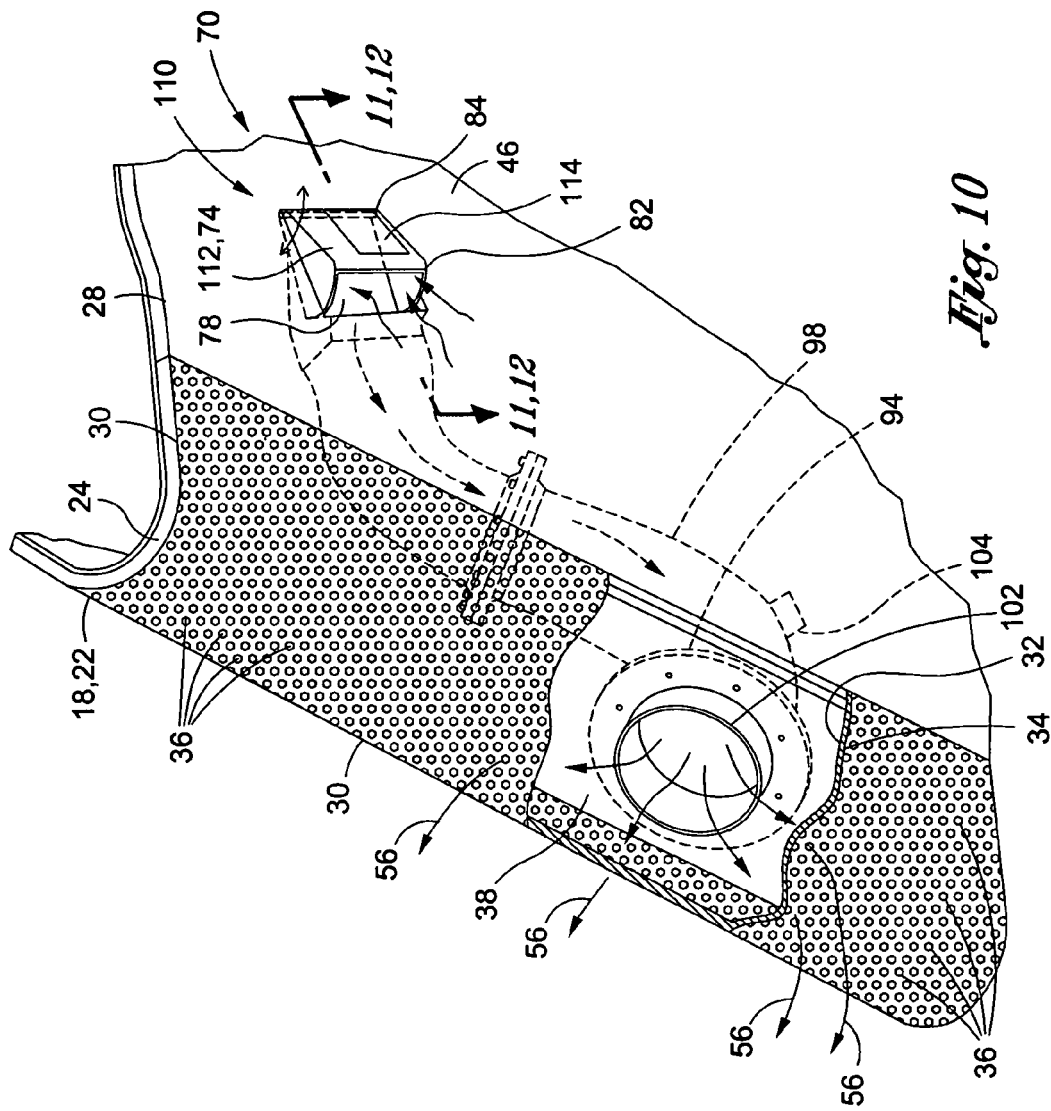
FIG. 10 is a perspective illustration of the purging system wherein the air scoop is configured as a door assembly having an aft-facing second door pivotally mounted to a forward-facing first door.

Referring to FIG. 10, shown is a perspective illustration of the air scoop 72 configured as a door assembly 110 having a second door 114 integrated with and pivotably mounted to a first door 112. The second door 114 may form a portion of the first door 112 as can be seen. Each one of the first and second doors 112, 114 is pivotably movable between open and closed positions and each define an opening 78 when moved to the open position 74. The opening 78 of the first door 112 preferably faces in a direction opposite the opening 78 of the second door 114. In this regard, the first and second door 112, 114 openings 78 may face away from one another. As shown in FIG. 10, the first door 112 opening 78 may be forward-facing (i.e., toward a direction of the oncoming external flow 50) and the second door 114 opening 78 may be aft-facing.

Referring to FIG. 11, shown is a cross sectional illustration of the door assembly 110 wherein the first door 112 is in the open position 74 and the second door 114 is in the closed position 76. As shown, the first door 112 opening 78 may be forward-facing for capturing the oncoming external flow 50 which may be ducted to the suction cavity 38 for discharge through the pores 36 to remove contaminants in the pores 36 in a manner similar to that described above with regard to the air scoop 72. The first door 112 is pivotable about a first pivot axis 116 between the open and closed positions 74, 76.

Referring to FIG. 12, shown is a cross sectional illustration of the door assembly 110 wherein the second door 114 is in the open position 74 and the first door 112 is in the closed position 76. The second door 114 is pivotable about a second pivot axis 118 between the open and closed positions 74, 76. When moved to the open position 74, the second door 114 opening 78 may generate an external region aft of the second door 114 that has an external pressure $p_e$ that may be less than a cavity pressure $p_c$ within the suction cavity 38. The external pressure $p_e$ may generate a suction force within the suction cavity 38 which may draw the external flow 50 through the pores 36 and into the suction cavity 38 and may then flow toward the door assembly 110 for discharge through the second door 114 opening 78 and into the external atmosphere 48.

Figure 13:
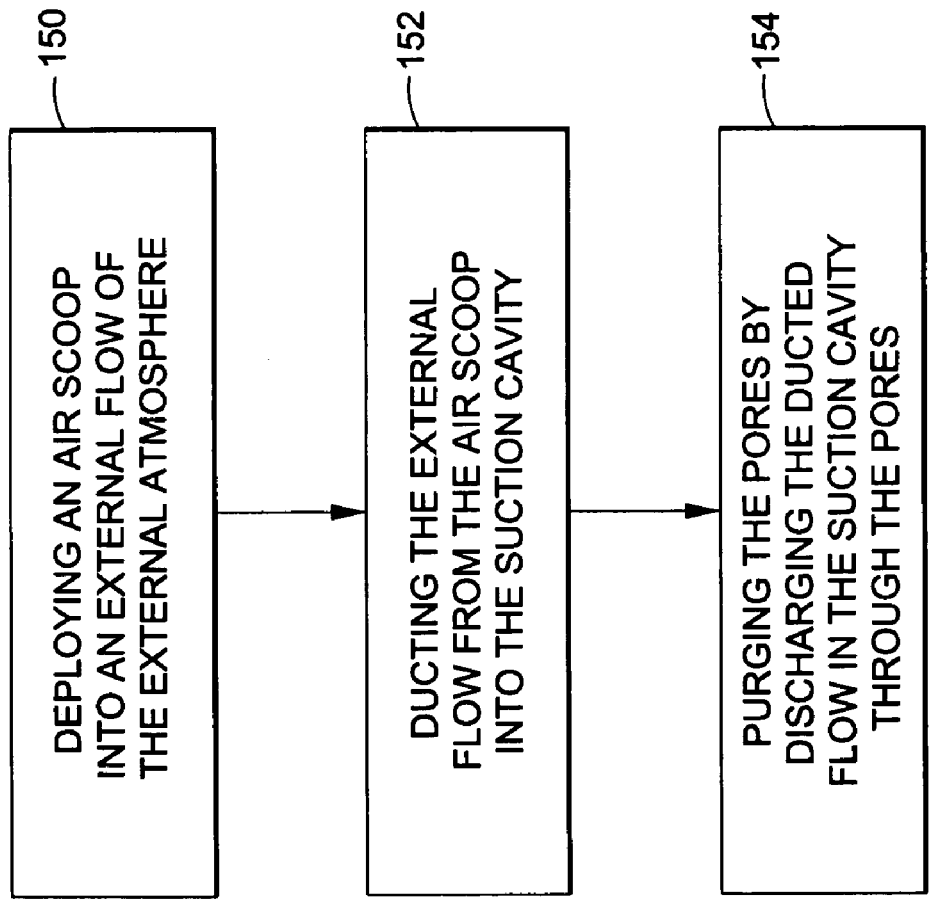
FIG. 13 is a methodology of purging a laminar flow control system using an air scoop and a diffuser.

Referring to FIG. 13, the purging system 70 as disclosed herein can be described in the context of a methodology for purging a laminar flow control system having a porous skin 30. As illustrated in the figures and as described above, the laminar flow control system includes the suction cavity 38 which may be disposed immediately adjacent the porous skin 30. In this regard, the suction cavity 38 is fluidly connected to the external atmosphere 48 through the plurality of pores 36 formed in the porous skin 30. In one embodiment, the porous skin 30 may be located at an area on an airfoil 22 wherein boundary layer 40 control is desired and may be provided using suctioning. In this regard, the laminar flow control system may be installed on a leading edge 24 of a vertical or horizontal tail or along the leading edge 24 of a wing 20. However, it is contemplated that the purging system 70 may be adapted for purging laminar flow control systems installed on any location and on any vehicle and is not limited solely to air vehicles but may also include land vehicles and other types of vehicles.

As illustrated in FIG. 13, the method may include step 150 of deploying the air scoop 72 into the external flow 50 of the external atmosphere 48. The external flow 50 may be of a high pressure and may be disposed adjacent the boundary layer 40 such that the deployment of the air scoop 72 may be opened thereinto. Step 152 of the method comprises ducting at least a portion of the external flow 50 through the opening 78 formed in the air scoop 72 and into the suction cavity 38. As illustrated in FIGS. 1-11, such ducting is facilitated through the use of the diffuser 98 which preferably includes an expanding cross-sectional area in order to reduce the velocity of the flow as the flow is ducted from the air scoop 72 to the suction cavity 38. Step 154 comprises purging the pores 36 by discharging the ducted flow in the suction cavity 38 through the pores 36 in order to clear the pores 36 of contaminants such as liquids and/or other debris and/or to prevent blockage or clogging of the pores 36 by contaminants as may occur when an aircraft 10 is flying through clouds or rain.

The methodology may further comprise the step of deploying the air scoop 72 between open and closed positions 74, 76. Such activation of the air scoop 72 deployment may be effectuated by means of pilot activation and/or environmental activation (i.e., autonomously) or any combination thereof. For example, it is contemplated that the air scoop 72 may be deployed automatically upon deployment of flaps as is typical prior to takeoff of an aircraft 10. In a further embodiment, the purging system 70 may be configured such that the air scoop 72 is activated into the deployed condition by pilot initiation. Furthermore, it is contemplated that the air scoop 72 may be configured to be deployed at any position intermediate the closed and open positions 76, 74 as may be desired in order to effectuate a desired pressure within the suction cavity 38 and also in consideration of flight parameters through which the aircraft 10 is operating as well as environmental considerations such as altitude and local weather conditions.

Additionally, the method of purging the laminar flow control system may comprise extracting contaminants such as liquid 54 or debris from the high pressure external flow 50 captured by the air scoop 72. Such extraction of contaminants may be effectuated by configuring the contour of the air scoop 72 such that contaminants impinge an interior side of the outer cowl 86 after which the contaminants may be guided toward the aft end 84 of the air scoop 72 and out of the drain holes 88 formed therein. Likewise, the methodology may further comprise the step of ducting the external flow 50 from the air scoop 72 toward the suction cavity 38 such that contaminants are directed onto side walls of the diffuser 98 whereafter the contaminants may be collected at a lowermost drain mechanism 104 positioned on the diffuser 98.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A purging system for a porous skin having an internal suction cavity, the porous skin including a plurality of pores fluidly connecting the suction cavity to an external atmosphere, the purging system comprising:
    an air scoop configured to capture an external flow of the external atmosphere; and
    a diffuser fluidly connecting the air scoop to the suction cavity and being configured to duct the external flow to the suction cavity to generate cavity pressure for discharge through the pores;
    the porous skin defining a leading edge of an airfoil having a sweep angle oriented such that the cavity pressure overcomes surface tension in liquid trapped in the pores.

2. The purging system of claim 1 wherein:
    the airfoil is a wing.

3. The purging system of claim 1 wherein:
    the air scoop includes a scooper door being pivotably movable between open and closed positions and defining an opening when the scooper door is in the open position.

4. The purging system of claim 3 wherein:
    the scooper door is configured to be positioned in substantially flush relationship with an external surface when the scooper door is in the closed position.

5. The purging system of claim 3 wherein:
    the scooper door is configured to be deployed into the open position by at least one of the following: pilot activation, autonomously by an actuation mechanism.

6. The purging system of claim 1 wherein:
the air scoop is configured to separate contaminants from the external flow captured by the air scoop.

7. The purging system of claim 6 wherein:
the air scoop has at least one drain hole formed therein for draining the contaminants.

8. The purging system of claim 1 wherein:
the porous skin defines opposing interior and exterior skin surfaces;
the air scoop having an opening for capturing the external flow;
at least a portion of the pores being of a size that causes the pores to retain the liquid as a result of the surface tension;
the interior skin surface having the cavity pressure being proportional to the external flow pressure at the opening;
the exterior skin surface having a local static pressure that is related to a local velocity of the external flow over the porous skin; and
the pores being sized and configured such that a pressure differential between the cavity pressure and the local static pressure is sufficient to overcome the surface tension resistance to cause the liquid in the pores to be discharged into the external atmosphere.

9. The purging system of claim 1 wherein:
the pores are sized in proportion to the sweep angle.

10. A purging system for a porous skin having an internal suction cavity, the porous skin including a plurality of pores fluidly connecting the suction cavity to an external atmosphere, the purging system comprising:
an air scoop configured to capture an external flow of the external atmosphere; and
a diffuser fluidly connecting the air scoop to the suction cavity and being configured to duct the external flow to the suction cavity for discharge through the pores;
the air scoop comprising a door assembly including:
a first door; and
a second door pivotably mounted to the first door;
wherein:
each one of the first and second doors is pivotable between open and closed positions and defining an opening when moved to the open position;
the openings of the first and second doors facing in opposite directions;
the first door opening being configured to capture the external flow for ducting through the diffuser toward the suction cavity for discharge through the pores into the external atmosphere;
the second door being configured to draw the external flow through the pores and into the suction cavity for ducting through the diffuser for discharge through the second door opening into the external atmosphere.

11. A method of purging a laminar flow control system having a porous skin defining a leading edge of an airfoil oriented at a sweep angle, the porous skin having a suction cavity fluidly connected to an external atmosphere through a plurality of pores formed in the porous skin, the method comprising the steps of:
deploying an air scoop into an external flow of the external atmosphere;
ducting the external flow from the air scoop into the suction cavity;
generating a cavity pressure overcoming surface tension in liquid trapped in the pores; and
purging the pores by discharging the ducted flow through the pores.

12. The method of claim 11 wherein the porous skin defines opposing interior and exterior skin surfaces, the air scoop having an opening for capturing the external flow, the cavity pressure being proportional to the external flow pressure at the opening, the exterior skin surface having a local static pressure related to a local velocity of the external flow over the porous skin, the method further comprising the step of:
configuring at least one of the air scoop and the pores such that the cavity pressure is sufficient to overcome the local static pressure.

13. The method of claim 12 wherein at least a portion of the pores are of a size causing retention of the liquid as a result of the surface tension, the method further comprising the step of:
configuring at least one of the air scoop and the pores such that a pressure differential between the cavity pressure and the local static pressure is sufficient to overcome the surface tension resistance to cause the liquid in the pores to be discharged into the external atmosphere.

14. The method of claim 13 wherein the step of configuring the pores comprises:
forming the pores at a size such that the pressure differential is sufficient to overcome the surface tension resistance.

15. The method of claim 12 further comprising the step of:
reducing a velocity of the external flow during ducting thereof from the air scoop to the suction cavity.

16. The method of claim 15 wherein the step of reducing the velocity of the external flow during ducting thereof comprises:
expanding the cross sectional area along which the external flow is ducted from the air scoop to the suction cavity.

17. An aircraft comprising:
a purging system for a porous skin of an airfoil defining a leading edge of a swept airfoil and having an internal suction cavity, the porous skin including a plurality of pores fluidly connecting the suction cavity to an external atmosphere, the purging system including:
an air scoop disposable into an external flow of the external atmosphere; and
a diffuser fluidly connecting the air scoop to the suction cavity and being configured to duct the external flow to the suction cavity to generate cavity pressure for discharge through the pores;
the leading edge having a sweep angle oriented such that the cavity pressure overcomes surface tension in liquid trapped in the pores.

18. The aircraft of claim 17 wherein:
the airfoil is a wing, having a leading edge defining a leading-edge sweep angle;
the porous skin being disposed adjacent to the leading edge.

19. The aircraft of claim 17 wherein:
the air scoop is configured to be moveable between open and closed positions.

20. The aircraft of claim 17 wherein:
the diffuser has a diffuser inlet at the air scoop and a diffuser outlet at the suction cavity;
the diffuser having an expanding cross sectional area along a direction from the diffuser inlet to the diffuser outlet.

21. The aircraft of claim 17 wherein:
the air scoop is configured to separate contaminants from the external flow captured by the air scoop;
the air scoop having at least one drain hole formed therein for draining the contaminants.

22. The aircraft of claim 17 wherein the airfoil may include surface water runback flowing therealong, the aircraft further comprising:
a diverter channel mounted on the airfoil and being configured to limit entry of surface water into the diffuser.

23. An aircraft comprising:
a purging system for a porous skin of an airfoil having an internal suction cavity, the porous skin including a plurality of pores fluidly connecting the suction cavity to an external atmosphere, the purging system including:
an air scoop disposable into an external flow of the external atmosphere; and
a diffuser fluidly connecting the air scoop to the suction cavity and being configured to duct the external flow to the suction cavity for discharge through the pores;
the air scoop comprises a door assembly including:
a first door; and
a second door pivotably mounted to the first door;
wherein:
each one of the first and second doors is pivotable between open and closed positions and defining an opening when moved to the open position;
the openings of the first and second doors facing in opposite directions;
the first door opening being configured to capture the external flow for ducting through the diffuser toward the suction cavity for discharge through the pores into the external atmosphere;
the second door being configured to draw the external flow through the pores and into the suction cavity for ducting through the diffuser for discharge through the second door opening into the external atmosphere.

* * * * *